March 20, 1945.  F. W. DOUTHITT  2,371,958
FERTILIZER DISTRIBUTOR
Filed July 9, 1943  2 Sheets-Sheet 1

INVENTOR
Frank W. Douthitt
By his Attorney
Harry N. Kilgore

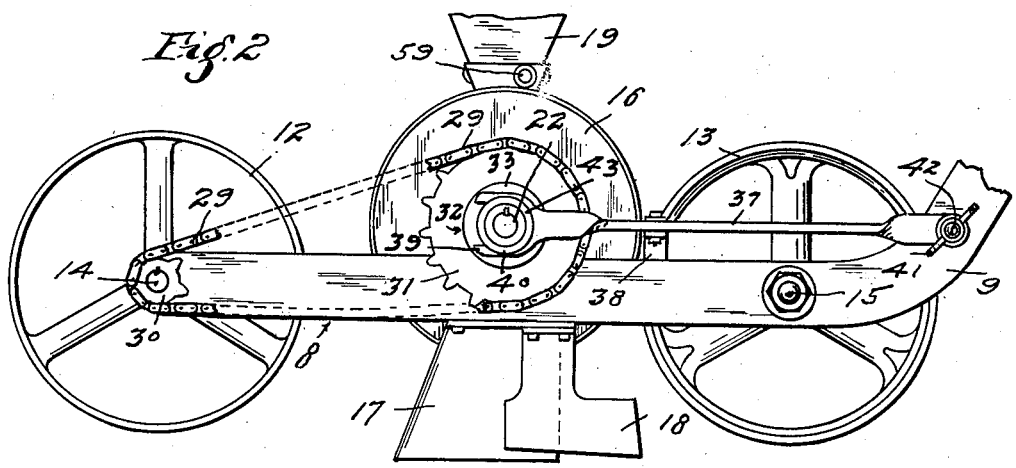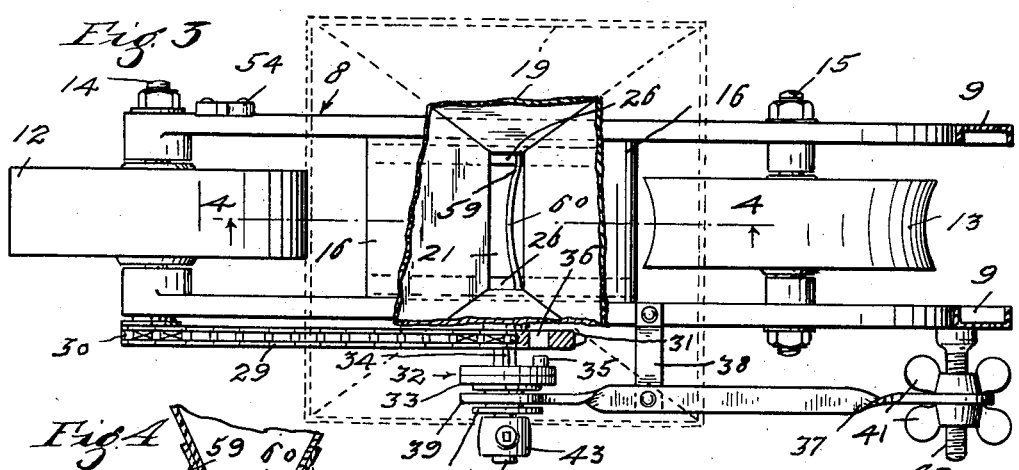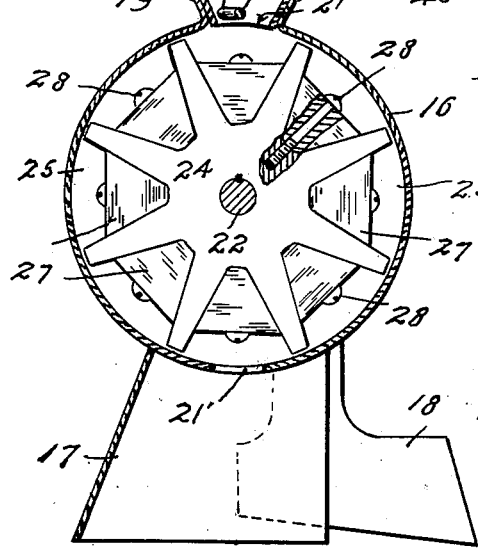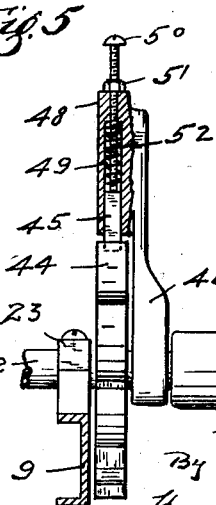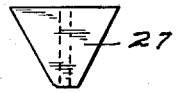

Patented Mar. 20, 1945

2,371,958

UNITED STATES PATENT OFFICE 2,371,958

FERTILIZER DISTRIBUTOR

Frank W. Douthitt, Big Stone City, S. Dak., assignor of one-half to Maurice V. Douthitt, Big Stone City, S. Dak., and one-half to Margaret V. Kraus, Le Center, Minn.

Application July 9, 1943, Serial No. 494,108

9 Claims. (Cl. 111—77)

My present invention relates to improvements in fertilizer distributors. The primary object of this invention is to provide a fertilizer distributor having selective means for automatically delivering measured quantities of fertilizer in substantially a continuous stream or for manually controlling the discharge of a measured quantity of fertilizer by a step-by-step movement at selective points.

The automatic control for the distribution of fertilizer is for discharging the same in substantially a continuous stream at one side of seed sown in a drill or at one side of vegetables, plants, etc., closely spaced apart in a row; and the manual control for the distributor of fertilizer is for discharging a measured quantity thereof at one side of tomato plants, corn and the like planted in hills or at a considerable distance apart.

Other objects of the invention will be apparent from the following description, reference being had to the accompanying drawings.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 2 is a fragmentary left-hand side elevation of the invention;

Fig. 3 is a plan view of the invention, some parts being broken away and sectioned;

Fig. 4 is a fragmentary detail, partly in side elevation and partly in vertical section, taken on the line 4—4 of Fig. 2, on an enlarged scale;

Fig. 5 is a fragmentary detail view, partly in elevation and partly in section, taken on the line 5—5 of Fig. 1, on an enlarged scale; and Figs. 6 and 7 are views in side elevation of different sized filler blocks.

Figure 1:
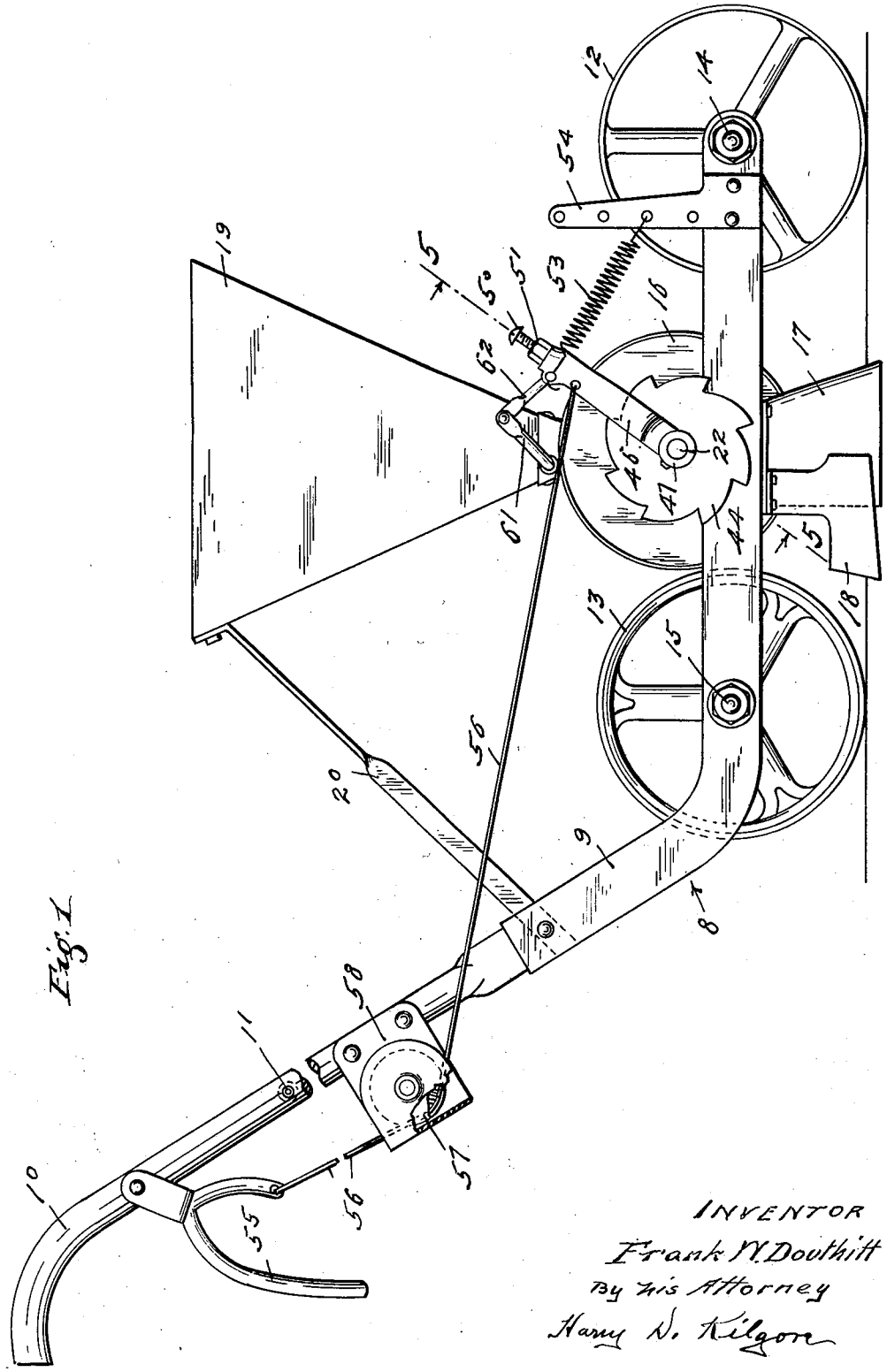
Fig. 1 is a right-hand side elevation of the invention, some parts being broken away.

The numeral 8 indicates a frame comprising a pair of laterally spaced horizontally disposed channeled side members 9. The rear end portions of the side members 9 are upwardly and rearwardly inclined and have a pair of handle bars 10 rigidly secured thereto. A cross-tie bar 11 connects the handle bars 10 at their intermediate portions. The frame 8 is carried by front and rear wheels 12 and 13, respectively, the former of which is a traction wheel and the latter of which is a pressure wheel, the tire of this wheel being concave in cross-section. The traction wheel 12 is keyed to a shaft 14 journaled in bearings on the frame side members 9 and the pressure wheel 13 is journaled on a fixed shaft 15 secured to said frame side members. Mounted on the frame 8, between the side members 9 and the wheels 12 and 13, is a cylindrical housing, the axis of which is horizontally disposed transversely of the frame 8.

Fixed to the frame side members 9, directly under the housing 16, is a plow 17 that is V-shaped in horizontal section for opening a furrow. Also secured to the frame side members 9, at the sides of the plow 17 and projecting rearwardly thereof, is a pair of coverers 18 for closing the furrow opened by said plow after fertilizer has been deposited therein. The pressure wheel 13 following the coverers 18 pack the earth filled in the furrow by said coverers.

A hopper 19, for holding a supply of fertilizer to be deposited in the furrow opened by the plow 17, is mounted on the top of the housing 16. Braces 20 connect the hopper 19 at the top of its back and to the upturned rear end portions of the frame side members 9. Formed in the top of the housing 16, in registration with the open bottom or throat of the hopper 19, is an oblong opening 21 which extends substantially the full width of said housing and through which fertilizer in the hopper is precipitated into the housing 16. In the bottom of the housing 16 is a discharge aperture 21', similar to the opening 21, and located between the sides of the plow 17. A shaft 22 extends axially through the housing 16 and is journaled in bearings 23 on the frame side members 9, one of which bearings is shown in Fig. 5. Mounted on the shaft 22, within the housing 16 and keyed for rotation therewith, is a wide fertilizer feed wheel 24 having circumferentially spaced peripheral pockets 25 for measuring predetermined quantities of fertilizer and discharging the same. The pockets 25 extend the full width of the wheel and the sides of said pockets are closed by the heads 26 of the housing 16. These pockets 25 are made adjustable, as to the quantity of fertilizer they will hold, by placing in each of said pockets a removable filler block 27. The filler blocks 27 are detachably secured to the hub of the wheel 24 by long screws 28 which extend through holes in said blocks. In Figs. 4, 6 and 7 are shown three different sizes of filler blocks 27.

The operation of the feed wheel 24 is selective, that is, it may be positively and continuously rotated or it may be manually and intermittently operated by a step-by-step movement. To continuously rotate the feed wheel 24, the following connections from the traction wheel 12 are provided. These connections include a sprocket chain 29 arranged to run over a small sprocket wheel 30 keyed to the left-hand end portion of the shaft 14, outwardly of the frame 8, and a large sprocket wheel 31 loose on the shaft 22. A clutch 32 is provided for connecting the sprocket wheel 31 to the shaft 22 and includes a movable member in the form of a disk 33 slidably mounted on the shaft 22 and held by a key 34 for rotation therewith. On the inner face of the disk 33 is an eccentrically located clutch pin 35 arranged to be projected into a hole 36 in the sprocket wheel 31.

To manually operate the disk 33 by sliding the same on the shaft 22, there is provided a shipper lever 37 intermediately pivoted to a bracket 38 on the left-hand frame side member 9. On the short end of the shipper lever 37 is a fork 39 that engages a shipper collar 40 on the outer face of the disk 33. The shipper lever 37 is positively held at its long end with the clutch 32 either set or released by two opposing thumb-nuts 41 on a screw-threaded stud 42 fixed to the left-hand frame side member 9. The screw-stud 42 extends loosely through a hole in the respective end portion of the shipper lever 37. A collar 43, on the outer end portion of the shaft 22, limits the movement of the clutch member 33 away from the sprocket wheel 31.

To manually and intermittently operate the feed wheel 24, at which time the clutch 32 must be released, there is provided a ratchet wheel 44 and a co-operating dog 45. The ratchet wheel 44 is secured to the outer right-hand portion of the shaft 22 and the dog 45 is carried by an arm 46 loosely pivoted to said shaft and held against lateral movement between the ratchet wheel 44 and a collar 47 on said shaft. The arm 46 is provided with an offset member 48 which overlies the sprocket wheel 44 and has in its lower end an upwardly projecting hole 49 in which the dog 45 is slidably mounted. A long screw 50 loosely extends through a hole in the upper end portion of the offset member 48 into the hole 49 and is secured to the dog 45. On the outer end portion of the screw 50 is a lock nut 51 that normally impinges against the upper end of the offset member 48. A coiled spring 52 in the hole 49 encircles the screw 50 and is compressed between the bottom of said hole and the inner end of the dog 45. A coil spring 53, anchored at one of its ends to a post 54 on the right-hand frame side member 9 and attached at its other end to the arm 46, is under strain to return the arm 46, and hence the dog 45, after they have been manually operated.

To manually operate the arm 45, I provide a hand-piece 55, pivoted to the right-hand handle bar 10 and connected by a wire or other cable 56 to said arm. This cable 56 runs over a grooved wheel 57 journaled in a bracket 58 on the right-hand handle bar 10. The hand-piece 55, by its engagement with the handle 10 to which it is pivoted, limits the return movement of the arm 46 by the spring 53.

By turning the screw 50 in the proper direction, the dog 45 may be raised to clear the teeth of the ratchet wheel 44 and held raised by adjusting the lock nut 51 to impinge against the arm offset member 48. Each time the dog 45 rides over a tooth on the ratchet wheel 44, under the action of the spring 53, it compresses the spring 52, moves the screw 50 upwardly through the hole in the top of the offset member 48, and lifts the lock nut 51 from said member.

Mounted in the throat of the hopper 19 is an oscillatory agitator 59 to prevent clogging of said throat with fertilizer and insure an even feed thereof. This agitator 59, as shown, is a rod journaled in bearings on the sides of the hopper 19 and having an offset intermediate portion 60. One end portion of the agitator 59, on the outside of the hopper 19, is bent to afford a crank-arm 61 connected to the arm 46 by a link 62. Obviously, as the arm 46 is reciprocated, the connections 61 and 62 will oscillate the agitator 59. When the feed wheel 24 is being rotated from the traction wheel 12, the dog 45 is, of course, held in an inoperative position as heretofore described, and the agitator 59 may be operated, at will, by manipulating the hand-piece 55.

*Operation*

It may be assumed that the hopper 19 is filled with fertilizer and it is desirable to deposit a predetermined amount of fertilizer at one side of tomato plants, corn, or any other vegetable or plant spaced a considerable distance apart, and in which case the clutch 32 is released and the dog 45 set in an operative position, as shown in the drawings. As the machine is wheeled at one side of a row of plants the same may be lifted and moved on its traction wheel 12 only between plants so that the plow 17 clears the ground and then lowered at the side of a plant so that only a relatively short furrow is opened. During the opening of a furrow the operator manipulates the hand-piece 55 and imparts a step of movement to the feed wheel 24 through the connections 56, 46, 45 and 44. This step movement of the feed wheel 24 brings one of its pockets 25 into registration with the aperture 21' through which the fertilizer is precipitated between the sides of the plow 17 and into the furrow. The following coverers 18 close the furrow and the pressure wheel 13 packs the loose earth filled in the furrow by said coverers. Obviously this manual control of the machine makes it possible to discharge a predetermined amount of fertilizer wherever wanted and thus preventing waste.

The automatic control of the discharge of the fertilizer may be briefly described as follows: In this adjustment of the distributor the dog 45 is held raised in an inoperative position by the lock-nut 51 and the clutch 32 is set by adjusting the thumb-nuts 41 to actuate the shipper lever 40 and move the disk 33 toward the sprocket wheel 31 and project the clutch pin 35 into the hole 36 in said wheel. With the clutch 32 set the feed wheel 24 is continuously driven by the sprocket chain 29 from the traction wheel 12. Obviously, the pockets 25 are successively filled with fertilizer as they pass under the open throat of the hopper 19. The manually operated agitator 59 keeps the fertilizer from packing in the throat of the hopper 19 and insures a constant flow of fertilizer into the pockets 25. Each pocket 25 holds a measured quantity of fertilizer which is carried in said pockets to the bottom of the housing 16 where the same is precipitated through the aperture 21' and into the furrow opened by the plow 17. The automatic adjustment of the distributor causes the feed wheel 24 to discharge substantially a continuous stream of fertilizer from the supply hopper 19 at the side of a row of vegetables or other plants.

It will be understood that the invention described is capable of various modifications within the scope of the invention herein disclosed and claimed.

What I claim is:

1. In a fertilizer distributor, a source of supply of fertilizer, a housing, a feed wheel mounted in the housing and having circumferentially spaced peripheral pockets into which fertilizer is discharged from said source, an agitator between said source of supply and the feed wheel, manually operated means for operating the agitator, releasable means for rotating the feed wheel from the agitator-operating connections, and means for rotating the feed wheel including a clutch.

2. In a fertilizer distributor, a frame, a traction wheel supporting the frame, a source of supply of fertilizer, a housing, a pocketed feed wheel mounted in the housing for removing fertilizer from said source and discharging the same, connections operative, at will, from the traction wheel for rotating the feed wheel, an agitator for the fertilizer, connections for manually operating the agitator, and means operative, at will, from the connections for operating the agitator for imparting a step-by-step rotary movement to the feed wheel.

3. In a fertilizer distributor, a frame, a front traction wheel and a rear pressure wheel supporting the frame, a plow on the frame for opening a furrow, coverers on the frame for closing the furrow in advance of the pressure wheel, a hopper for holding a supply of fertilizer and having a discharge throat, a housing, a pocketed feed wheel mounted in the housing for removing fertilizer from the throat of the hopper and discharging the same into the furrow opened by the plow, driving connections including a clutch for rotating the feed wheel from the traction wheel, a shipper lever for operating the clutch, means for holding the shipper lever with the clutch either set or released, manually operated means for imparting a step-by-step rotary movement to the feed wheel, said means including a ratchet wheel on the feed wheel, a co-operating dog for rotating the ratchet wheel and connections for operating the dog from a distant point, an agitator in the throat of the hopper, and means for operating the agitator from the dog-operating connections.

4. The structure defined in claim 3 further including means for holding the dog in an inoperative position.

5. The structure defined in claim 3 further including means for holding the dog in an inoperative position, whereby the manual connections for operating the dog may be used to operate the agitator when the feed wheel is being rotated from the traction wheel.

6. In a fertilizer distributor, a frame, a traction wheel supporting the frame, a hopper for holding a supply of fertilizer and having a discharge throat, a pocketed feed wheel mounted in the housing for removing fertilizer from said throat and discharging the same, connections including a clutch operative, at will, from the traction wheel for rotating the feed wheel, manually-operated means for imparting a step-by-step movement to the feed wheel including a ratchet wheel on the feed wheel, a pivoted arm, a dog carried by the arm for co-operating with the ratchet wheel, means for oscillating the arm, means for holding the dog in an inoperative position, an agitator in said throat, and operating connections from the arm to the agitator.

7. In a fertilizer distributor, a source of supply of fertilizer, a housing, a feed wheel mounted in the housing and having circumferentially spaced peripheral pockets into which fertilizer is discharged from the supply, automatic means including a clutch for driving the feed wheel, an agitator for the fertilizer, manually-operated means for actuating the agitator, at will, and separable connections from said manually-operated means for driving the feed wheel when the clutch in the automatic means is released.

8. In a fertilizer distributor, a source of supply of fertilizer, a housing, a feed wheel having a drive shaft journaled in the housing, said feed wheel having circumferentially spaced peripheral pockets into which fertilizer is discharged from the supply, automatic means including a clutch on said shaft for rotating the feed wheel, a ratchet wheel on the shaft, a spring-retracted arm loosely pivoted on the shaft, a dog on the arm for operating the ratchet wheel, means for rendering the dog inoperative, at will, a connection for manually operating the arm to impart steps of movement to the feed wheel, an agitator for the fertilizer, and connections for operating the agitator from the arm.

9. In a fertilizer distributor, a source of supply of fertilizer, a housing, a feed wheel having a drive shaft journaled in the housing, said feed wheel having circumferentially spaced peripheral pockets into which fertilizer is discharged from the supply, automatic means including a clutch on said shaft for rotating the feed wheel, a ratchet wheel on the shaft, a spring-retracted arm loosely pivoted on the shaft, a dog on the arm for operating the ratchet wheel, means for rendering the dog inoperative, at will, a connection for manually operating the arm to impart steps of movement to the feed wheel, an agitator for the fertilizer, and a toggle joint for operating the agitator from the arm.

FRANK W. DOUTHITT.